United States Patent [19]

Stein

[11] Patent Number: 4,685,616
[45] Date of Patent: Aug. 11, 1987

[54] PROCESS AND SWITCHING MEANS FOR CONTROLLING HEAT PERFORMANCE IN A HEATING DEVICE

[75] Inventor: Friedrich Stein, Munich, Fed. Rep. of Germany

[73] Assignee: Webasto-Werk W. Baier & Co., Gauting, Fed. Rep. of Germany

[21] Appl. No.: 863,436

[22] Filed: May 15, 1986

[30] Foreign Application Priority Data

May 18, 1985 [DE] Fed. Rep. of Germany ....... 3517953

[51] Int. Cl.$^4$ .............................................. B60H 1/00
[52] U.S. Cl. .................................... 237/12; 237/2 A; 236/91 F; 236/46 F
[58] Field of Search .................. 237/2 A, 12; 236/94, 236/10, 11, 91 F, 46 F

[56] References Cited

U.S. PATENT DOCUMENTS

4,373,662  2/1983  Bassett et al. .......................... 236/10
4,411,385  10/1983 Lamkewitz ............................. 237/2
4,436,064  3/1984  Lamkewitz et al. ............. 123/142.5

Primary Examiner—Henry A. Bennet
Attorney, Agent, or Firm—Sixbey, Friedman & Leedom

[57] ABSTRACT

A process for controlling heat output of a heating device, such as an auxiliary heating device for a vehicle, and a switching arrangement for performing such process. The governing value in controlling the heat output is the temperature gradient with respect to time during heating of a heat exchange medium between two temperature threshold values. The threshold values are empirically determined and prespecified. The operating condition of the heating device is regulated in dependence upon the slope of the temperature gradient which is determined, preferably, based upon the time for heat-up of the heat exchange medium. The heat-up time is measured with the aid of a timer, and the heating time thus measured is compared with predetermined, prespecified values therefor. The temperature gradient of the heat exchange medium is determined by way of a sensing device in the switching arrangement, which is connected with a control unit, and which correspondingly activates the heat output control means of the heating device. The control unit effects control of the heating device units, dependent upon comparative results, which are based on prespecified values for the heating period.

22 Claims, 7 Drawing Figures

FL = FULL LOAD
PL = PARTIAL LOAD
CP = CONTROL PAUSE

PROCESS AND SWITCHING MEANS FOR CONTROLLING HEAT PERFORMANCE IN A HEATING DEVICE

BACKGROUND AND SUMMARY OF THE INVENTION

The invention relates to a process and switching means for regulating heating output of a heating device, especially a heating device intended for use as an auxiliary heater in vehicles, or as a stationary heater, where the heat output is produced via a heat exchange medium. More particularly, wherein heat output is controlled in dependence upon a control temperature and predetermined temperature threshold values. Suitable heat exchange media are a liquid, e.g., water, or a gas, e.g., air.

German Offenlegungsschrift No. 30 31 410 (U.S. Pat. No. 4,411,385) shows a control device for operating a heating apparatus, particularly for use in vehicles, in which, for the purpose of heat output control, a control temperature, e.g., the temperature of a liquid heat exchange medium, is determined by a sensor, and the heating device is operated with a variety of possible heating stages, dependent upon empirically determinable temperature threshold values. Upon triggering of a first temperature threshold value, for instance, a vehicle blower is activated, and after passing a second, higher, temperature threshold value, operation of the heater is switched to a partial load range and then subsequently back to full load range operation, if appropriate.

German Pat. No. 30 24 983 (U.S. Pat. No. 4,436,064) didcloses a process and control means for determining a preheating energy quantity, in which, for the preheating of a heatable object or space prior to an intended time of usage, and particularly for the preheating of a motor vehicle, a selected preheating result can be automatically obtained with the lowest possible energy consumption and utmost amount of safety. Here too, several variable heating stages can be passed for preheating, dependent upon the tempeature differences between the initial temperature and the desired heat-up temperature.

In all of these previously known heating control devices, there is short-term deactivation and activation of the heating device within brief control intervals during the vehicles's operation, for preheating as well as for main heating, particularly, if the heat output requirement is small. This not only reduces the service life of the burner units, but causes the entire heating device to have a tendency towards coking and sooting. Such unfavorable operating conditions may result in reduced operational safety, as well as diminished ease in starting the device. Under such circumstances, the heating device operates with low efficiency, relative to the heat energy produced and electrical energy consumed, and consequently presents the drawback of relatively high energy consumption. This is an especially negative factor, when the electrical energy supply for the heating device is derived from a battery, as in a motor vehicle.

It is, therefore, a primary object of the invention to provide a process and a switching apparatus for regulating the heat output of a heating device operating with various levels of heating performance and with a heat exchange medium, which results in a more efficient operation of the heating device, while eliminating coking or sooting of the heating device, and also overcoming the other drawbacks and problems discussed above.

In accordance with a preferred embodiment of the invention, a process for controlling the heat output of a heating device employing a heat exchange medium involves determining a temperature gradient for heating the heat exchange medium between two temperature threshold values and then controlling the operational level of the heating device in dependence upon the slope of the temperature gradient. A corresponding switching arrangement for performing such process utilizes a sensing device to measure the temperature gradient and is connected with a control unit which activates a heat output control dependent upon the slope of the temperature gradient.

In the process of controlling the heat output, in accordance with the preferred embodiment of the invention, the temperature gradient, for the heating of the heat exhanger medium (gas or liquid) between two temperature threshold values (these values being empirically determinable and prespecified for controlling heat output), is ascertained by the application of a control temperature value. The slope of this temperature gradient is a measure of the actual heat output requirement, or is a measure of the ratio of heat output produced to energy consumed by the heating device.

A determination of the temperature gradient and its slope permits an increase and an extension of the intervals of between control pauses and the reactivation of the heating device, eliminating undesirable control fluctuations with resultant changes in operating conditions of the device. The electrical energy consumption for operating the heating device can be lowered, and thus an efficient heating performance encompassing various preheating stages, as well as main heating is ensured. As there is no necessity of repeated reactivation and ignition of the heating device within short intervals, the service life of the burner units is extended, and the problems of coking as well as soot formation are eliminated in the heating device.

The characteristic measured to determine the slope of the temperature gradient is the time required for heating the heat exchange medium from the first temperature threshold value to the second temperature threshold value. Such a heating period can easily be determined using the principles of control technology and can be processed in an uncomplicated manner with regard to influencing the heat control process.

The measured heating period is coordinated with the respective characteristic operating ranges of the heating device in the following manners. A first predetermined time value is selected for the time interval required to heat the heat exchange medium from the first to the second threshold values. If the measured heat-up time falls below this preset time value during the heat-up interval, the heating device is switched off because, presumably, there is an operational malfunction, or an error in operating the heating device. In this instance, the temperature gradient is very steep, which means that the heat exchange medium is heated from the first tempeature threshold value to the second temperature threshold value within a short time, resulting in a very low heating output by the heating device. In such case, the heating device is automatically switched off, in order to avoid damage thereto or to prevent a triggering of the overheating safeguard device, and/or to eliminate a heating operation which is not oriented towards actual heating demand. When a liquid is used as a heat exchange medium it may continue to circulate in the device by way of a circulating pump, for the purpose of dissipating heat, or alternatively, the circulating pump itself may also be switched off.

A second empirically predetermiend, preset time value for the heating period is used which is greater than the first predetermined time value. If the measured heat up time value falls below this second preset value, the temperature threshold value for changing the operating condition of the heating device is lowered. Such a procedure applies when the heating device supplies a higher output than is necessary for heating, and occurs particularly, when heating during the warmer transitional seasons, with reduced control valves or closed vent flaps, or when heating with the internal combustion engine warmed up. Lowering of the temperature threshold value for a change in operating conditions of the heating device avoids having the heating device successively switched on and switched off within a short time interval, when such is not necessary on the basis of the required heat demand.

Furthermore, in the process, the heat output of the device is controlled in the usual manner depending upon the control temperature in variously possible heating stages, when the second preset value for the heating period is exceeded. Accordingly, this process enables the heating device to work with the normal basic control operation for the supply of heat energy.

The temperature range used for determining the temperature gradient is selected to fall between the lower temperature threshold value that triggers the activation of the vehicle blower, and the higher temperature threshold value which effects a reversal of the heating device to partial load conditions, both of these value having been previously present. Empirically determinable temperature threshold values range from between approximately 50° C. for the lower threshold value and 80° C. for the higher threshold value.

The switching arrangement, in accordance with the invention, facilitates easy implementation of the inventive control process. If appropriate the switching arrangement can be realized by a microprocessor component or a highly integrated logic module.

In the preferred embodiment switching arrangement, there is cooperation between a sensor device for determining the temperature gradient, a control unit connected with the sensor device, and the heat output regulating control of the heating device, for the purpose of activating the heat output control means of the heating device, dependent upon the temperature gradient determined by the sensor device, such that the heat supplied by the heating device is based on demand, while simultaneously avoiding critical operating conditions.

The sensor device, appropriately, comprises a timer for measuring the heat-up time between threshold values to determine the temperature gradient slope. The heat-up time is the governing regulating value here, and based thereon, with consideration to special operating ranges of the device, there is corresponding activation of the heating output control via a control unit of the switching arrangement.

Additionally, a malfunction indicator device can be provided which is activated by the control unit and which issues a malfunction signal when, based on readings sensed by the sensor device, the heat exchange medium heats up very rapidly. The cause for such rapid heating may be an operational malfunction or an error on the part of the operator of the heating device. In a given case, the circulating pump used for circulating the liquid heating exchange medium can continue operation to dissipate residual heat, or, alternatively, it may also be turned off.

By way of the switching arrangement, the heat output regulating control for operation of the heat output control means is changed such that, in comparison with the basic control operation, longer control pauses between changes in switch conditions of the heat output control means are attained. This permits a reduction of electrical energy consumption of the heating device and leads to an increase in total performance reliability.

Appropriately, comparator controls are used, for determining individual switch conditions of the control unit, in the switching arrangement.

Upon reaching the first, lower temperature threshold value, the timer can be switched on to measure time, and it can be switched off when the second temperature threshold value is reached. The time difference can be ascertained by means of a differential determining device, in a given case.

It is to be understood that the switching data may also be integrated into a microprocessor or other highly integrated logic component.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
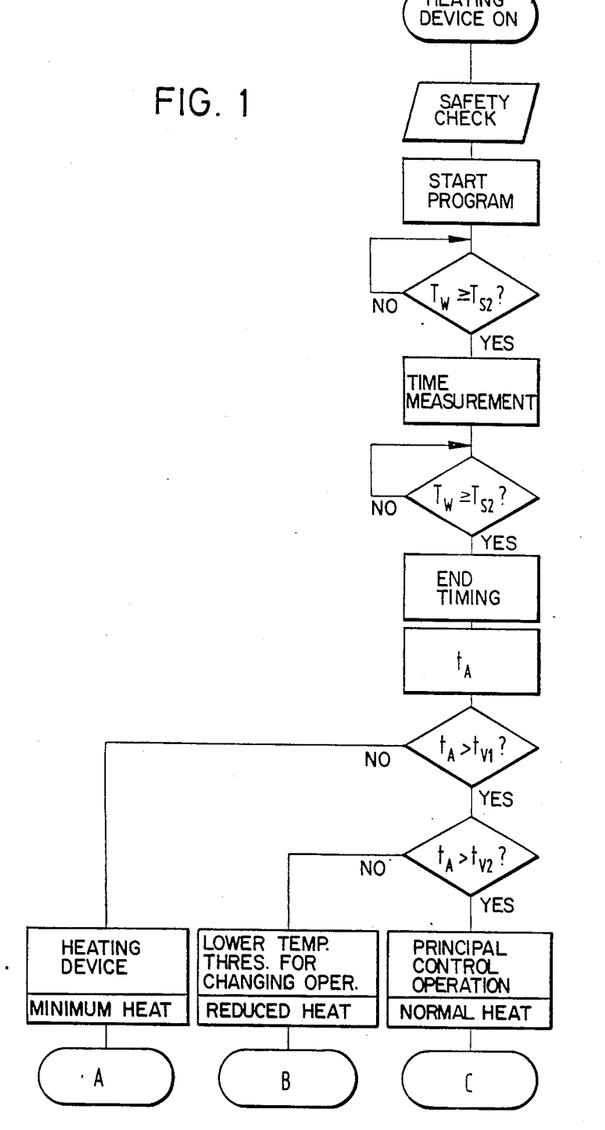
FIG. 1 is a schematic flow diagram illustrating a process for controlling heating performance in accordance with a preferred embodiment of the invention.

The flow diagram according to FIG. 1 illustrates the various regulating process steps for controlling heat output in accordance with the invention. First, the heating device is started, and, subsequently, safety checks are performed of the heating device before starting the actual regulating process. If the temperature of the heat exchange medium $T_W$, e.g., water, in a heating device is lower than a first predetermined temperature threshold value $T_{S1}$, the comparison of heat exchange medium temperature value $T_{S1}$ is repeated constantly. As soon as the temperature of the heat exchange medium $T_W$ is larger than the first predetermined temperature threshold value $T_{S1}$, time measurement is initiated. To this end, a timer is activated. When the temperature $T_W$ of the heat exchange medium has reached a second predetermined temperature threshold value $T_{S2}$, time measuring is terminated, and the timer is stopped.

Subsequently, the heat-up time $t_A$ is determined, i.e., that time which is required to heat the heat exchange medium from the first predetermined temperature threshold value $T_{S1}$ to the second predetermined temperature threshold value $T_{S2}$. At this time, the heat-up time $t_A$, thus determined, is compared with a first predetermined time value $t_{V1}$. If the heat-up time $t_A$ is greater than the first predetermined time value $t_{V1}$, in a further step, it is ascertained whether the heat-up time $t_A$ is greater or smaller than the second predetermined time value $t_{V2}$ for the heat-up time period if the heat-up time $t_A$ is smaller than the predetermined temperature threshold value for effecting a change in the operational state of the heating device is reduced to a lower temperature value. Accordingly, at this stage of the control procedure, there is a reduced heat requirement, and the control process proceeds in control range B, which is further described by way of FIGS. 2 and 3b.

When the heat-up time $t_A$ is greater than the second predetermined value $t_{V2}$, heating performance is regulated in the principal or basic control operation, and the control process proceeds according to control range C, which is further explained with reference to FIGS. 2 and 3c.

However, if the heat-up period $t_A$ is smaller than the first predetermined value $t_{V1}$, the heating device is turned off, whereby, a liquid heat exchange medium, for example, continues to circulate due to the continued operation of the circulating pump, to dissipate residual heat, or alternatively, this pump also is turned off. In this comparison result, there is no heat requirement present and the control process takes place in range A, which is further described in FIGS. 2 and 3a.

Figure 2:
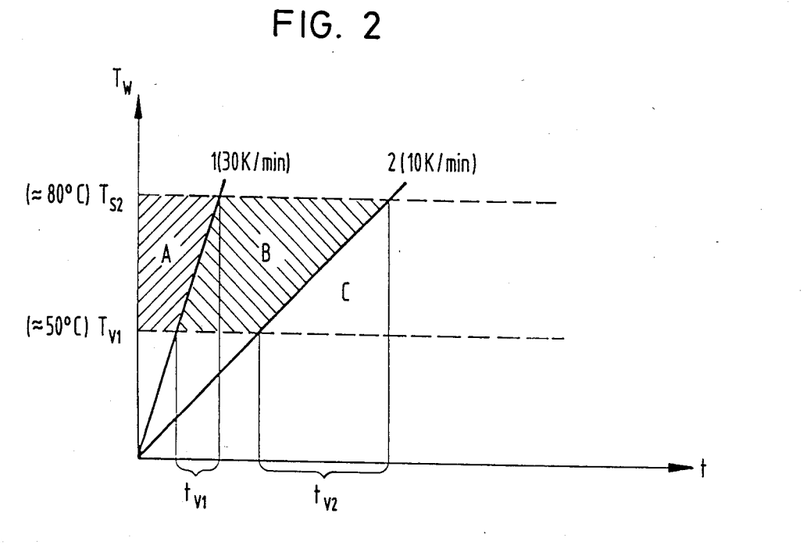
FIG. 2 is a temperature-time diagram illustrating the course of the temperature gradient and the varying switching conditions of the heat output regulating control resulting therefrom.

In FIG. 2, temperature $T_W$ of the heat exchange medium is plotted over time t. As an example, for the first temperature threshold value $T_{S1}$ approximately 50° C. is selected, which is the value, for instance, which turns on the vehicle blower of the vehicle's own heating device. As a second predetermined temperature threshold value $T_{S2}$, a temperature of approximately 80° C. has been selected, at which temperature the heat output is cut back from the full load to the partial load range. At a temperature $T_W$ which is higher than the second temperature threshold value $T_{S2}$, the heating device is shifted from operation in the partial load range to a control pause (rest period). At a temperature $T_W$ between the two temperature threshold values $T_{S1}$ and $T_{S2}$, there can be a reversal in the heat control process from partial load to full load. If temperature $T_W$ is smaller than the first temperature threshold value $T_{S1}$, the vehicle blower is switched off.

Heating time $t_A$ for determination of the temperature gradient for heating of the heat exchange medium between the two temperature threshold values $T_{S1}$ and $T_{S2}$ is plotted onto time axis t of the FIG. 2 graph. The first predetermined value for the heating time is designated $t_{V1}$, and $t_{V2}$ designates the second predetermined value for the heating time.

A first limit curve is indicated with 1, and is approximately linear. This curve is the result, for instance, of a heat output of 30 K/min. A second limit curve 2, is the result of an output of 10 K/min, for instance, and is, likewise, approximated as a straight line. The respective control ranges, which correspond to those in the flow diagram according to FIG. 1, have been similarly designated A, B and C in FIG. 2.

Accordingly, in range A, in which the heat-up period $t_a$ is smaller than the first predetermined value $t_{V1}$, temperature $T_W$ of the heat exchange medium rises very rapidly, with the result of a steeply extending temperature gradient for the heating of the exchange medium. In this range A, therefore, the heat output supplied by the heating device cannot be consumed. This condition may have been caused by a malfunction, or a faulty operation of the device, and may be the result, for instance, of a closed heating control valve or any other zero balance in the cycle, for instance, a liquid exchange medium. In this range A, the control will automatically be turned off because, in this operating condition, the heat output supplied by the device is not dissipated so that the continued operation of the heating device would consume energy unnecessarily. On the other hand, the circulating pump for a liquid heat exchange medium, for instance, can continue to operate for dissipating residual heat.

In range B, there is a relatively rapid temperature rise, or a relatively steep temperature gradient is obtained for the heating of the heat exchange medium, and in this range the following conditions met: $t_{V1} < t_A \leq t_{V2}$. With such a temperature gradient, it is to be expected that the heating device will supply a larger heating output in partial load operation than can be totally dissipated or is required.

Particularly during the warmer transition periods of the year, the available heating output in this range is larger than the demand. This condition may also arise as a consequence of closed heat regulating valves or closed vent flaps. Such a control range also can be reached during main heating, with the internal combustion engine in a warmed-up condition. When in this range B, upon reaching or exceeding the second predetermined temperature threshold value $T_{S2}$, heat output control operation is interrupted, and a so-called control pause is initiated. Moreover, the switching point from partial load operation to full load operation is considerably reduced in the direction towards lower temperatures, as for instance, to the first predetermined temperature threshold value $T_{S1}$, or even lower.

Such a control procedure for heat output in range B prevents a rapid change from the combustion operation of the heating device, to a control pause, and vice versa. Conversely, however, by a rise in heat demand, for instance, the control values may change and the control process shifts over to control range C.

In control range C, heating output supplied by the device is smaller in partial load operation than the heat output demanded. The heating device in this range alternates between full load and partial load range operational states, or operates only in the full load range. As this control range does not require a reactivation of the heating device, only a small amount of electrical energy is consumed. Thus, control range C offers the most favorable energy efficient rate.

If the heating device is utilized for main heating as a self-contained heating system of a vehicle, and if temperature $T_W$ of the liquid heat exchange medium at the time of activating the heat device is between the two temperature threshold values $T_{S1}$ and $T_{S2}$, control proceeds as in control range B. After cooling of temperature $T_W$ of the heat exchange medium to the first predetermined temperature threshold value $T_{S1}$, and after renewed operation of the heating device, heat up period $t_A$ between the two temperature threshold values $T_{S1}$ and $T_{S2}$ is measured, as can be seen from FIG. 1.

Figure 3A:
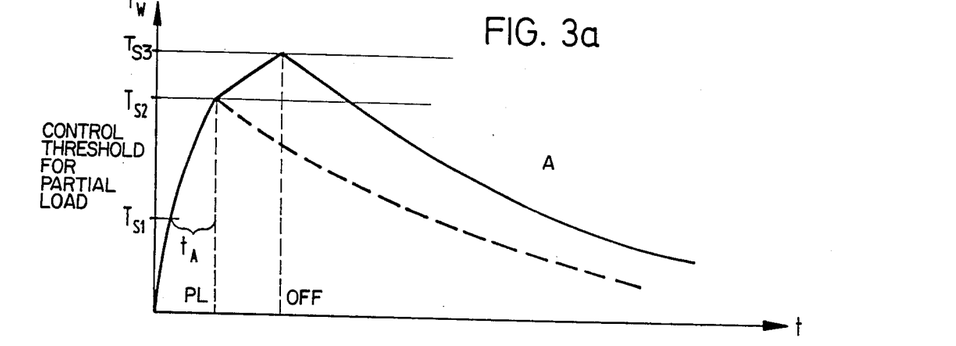
FIGS. 3a-3c are schematic views illustrating the process of heating performance control in the various ranges indicated in FIG. 2.
Figure 3B:
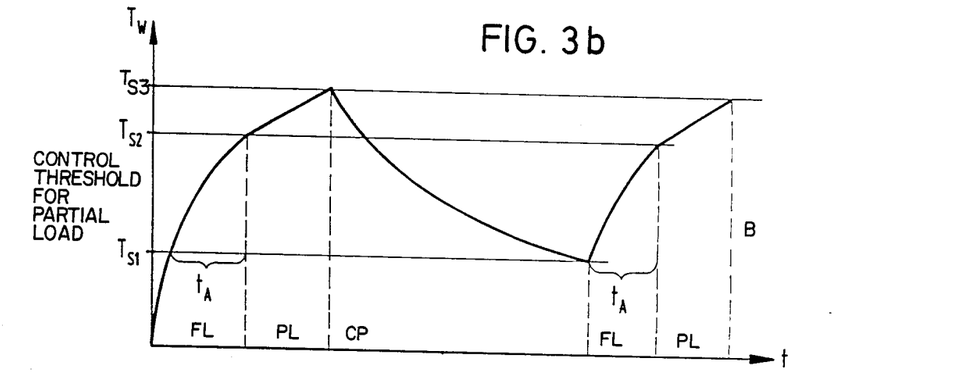
Figure 3C:
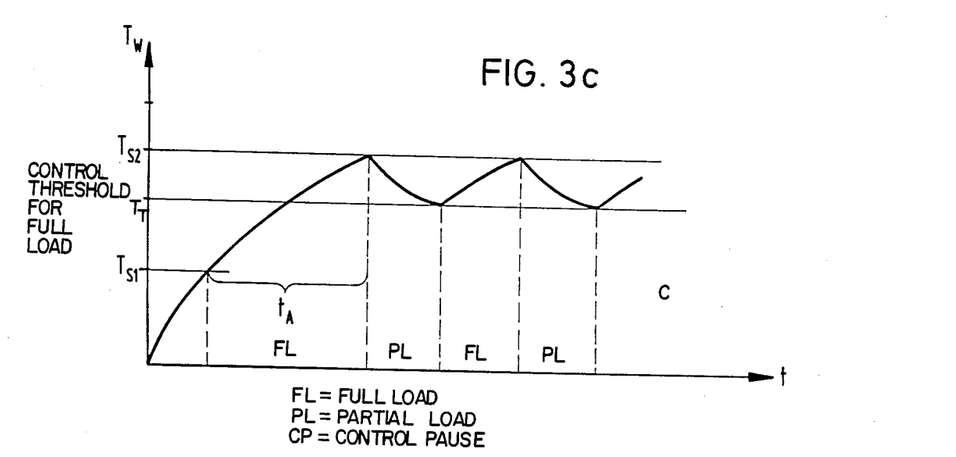

FIGS. 3a to 3c schematically depict the control sequences in control range A, B and C, according to FIGS. 1 and 2.

In FIG. 3a, during the heat output control in range A, the heating device operates in the full load condition $V_L$ and is immediately deactivated upon reaching the second predetermined temperature threshold value $T_{S2}$ (broken line curve) or, alternatively, the heating device shifts to partial load operation upon reaching the second predetermined temperature threshold value $T_{S2}$, and subsequently is deactivated at temperature threshold $T_{S3}$ (solid line curve). In the latter control procedure, there is also dissipation of residual heat.

In control range B, according to FIG. 3b, the heating device shifts to partial load operation PL upon reaching the second predetermined temperature threshold value $T_{S2}$ and, once threshold $T_{S3}$ is reached, a control pause (rest period, RP) is initiated in the procedure, during which only the vehicle blower and a water pump of the heating device remain in operation. As soon as temperature $T_W$ of the heat exchange medium has fallen back again to the first predetermined temperature threshold value $T_{S1}$, heat output is supplied in full load operation until the second predetermined temperature threshold value $T_{S2}$ is once again reached. At this point in the procedure, the heating device reverts from full load to partial load operation. Accordingly, a cycle, running from full load, to partial load, to control pause, represents the respective sequence of control stages transversed.

FIG. 3c depicts a control range C, in which the heating device is operated in full load range FL until temperature threshold value $T_{S2}$ is reached, thereupon operation in the partial load range PL is commenced, and upon reaching a triggering temperature $T_T$, which falls between the two temperature threshold values $T_{S1}$ and $T_{S2}$, reverts to full load operation until reaching the second predetermined temperature threshold value $T_{S2}$. In this control range, there is a cyclic reversal between partial load and full load operation.

Figure 4:
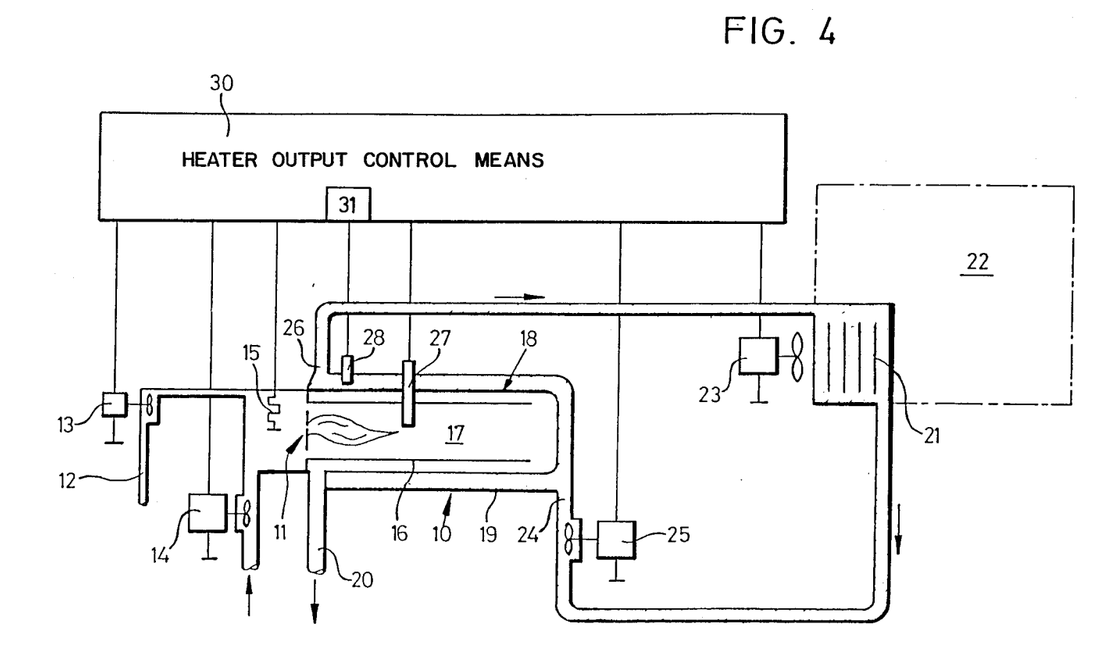
FIG. 4 is a schematic diagram of a heating device with a preferred embodiment switching arrangement for controlling heating performance, in accordance with the invention.

In FIG. 4, a block diagram depicts a switching arrangement for controlling the output of a heating device in accordance with the invention. The example selected, is a heating device with a liquid heat exchange medium, like water. It is to be understood that in an analogous manner, a gaseous heat exchange medium, like air, can be utilized. Heating device 10 has a burner unit 11, which receives fuel via a fuel line 12, in which there is a fuel pump 13. Burner unit 11 further is supplied with air via combustion air blower 14. The mixture consisting of combustion air and fuel thus produced in the burner unit is ignited by means of ignition device 15, which, for example may consist of a glow plug. In a combustion chamber 17, defined by fire tube 16, the combustion mixture is burned, and the hot combustion gases resulting therefrom pass their heat to a liquid heat exchange medium, like water, flowing in a water jacket 19, by means of heat exchanger 18. The combustion gases, which have cooled down in heat exchanger 18 during the heat exchange process, are expelled from heating device 10 via an exhaust 20.

In the example depicted in FIG. 4, the heating device 10 is integrated into a water (coolant) circulation system in which there is also disposed a heat exchanger 21 which serves, in the usual manner, to heat the interior of a vehicle passenger compartment 22. Vehicle blower 23 coacts with heat exchanger 21. A water inlet area of heating device 10, designated with numeral 24 in FIG. 4, has a water circulating pump 25. This pump passes the water used as the liquid heat exchange medium through water jacket 19 of heating device 10, whereafter, water exits via water outlet area 26 of the device and flows to the inlet side of heat exchanger 21. The outlet side of heat exchanger 21 is connected with water inlet area 24 of heating device 10 for completing the water circulation system. Furthermore, a flame detector 27 is indicated in FIG. 4, which may project into combustion chamber 17 to monitor the flame formation during combustion, and a temperature sensor 28, sensing the temperature $T_W$ of a liquid heat exchange medium, like water, is disposed in water jacket 19, preferably in proximity of water outlet area 26 of heating device 10.

A heat output control device is generally designated with reference numeral 30, and is connected with the fuel pump 13, the combustion in blower 14, the ignition device 15, the temperature sensor 28, the flame detector 27, the water circulation pump 25, and the vehicle blower 23 for heat exchanger 21. The heat output control means 30 produces a basic control operation of the heating device. A control unit 31 activates output control means 30, in accordance with the invention.

Figure 5:
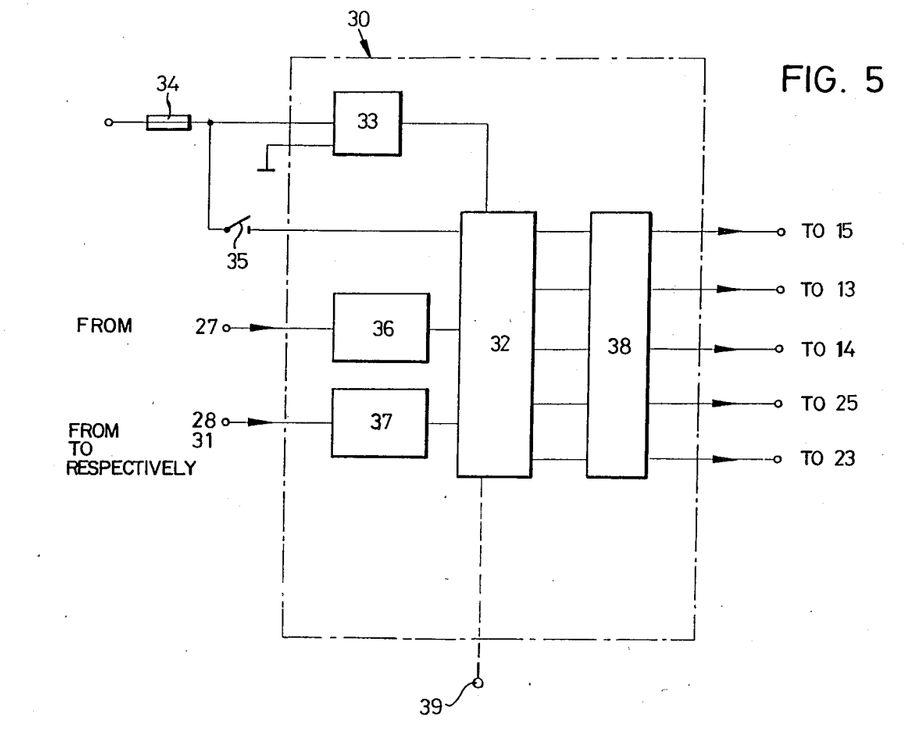
FIG. 5 is a block diagram of the switching control device.

FIG. 5 shows an example of a heat output control means 30. In the example depicted, the control unit 31 is integrated into a microprocessor 32. Power supply arrangement 33 provides power, for example, from a vehicle battery (not depicted) to microprocessor 32. A safety fuse 34 is disposed in the supply line to power supply arrangement 33. Further, there is a master switch 35 which, in a closed condition, supplies power to microprocessor 32 via power supply arrangement 33.

A flame detector signal, emanating from flame detector 27 in FIG. 4, is transmitted to microprocessor 32 via an analog/digital transducer 36. The signal by temperature sensor 28 in water jacket 19, in accordance with FIG. 4, is transmitted to microprocessor 32 via another analog/digital transducer 37. The tempeature gradient is determined in microprocessor 32 via the transmitted signal of temperature sensor 28, and dependent upon its slope, heat control is effected in accordance with the inventive process.

In dependence upon the values determined in the microprocessor 32 (which also incorporates a timer), appropriate components of a the heating device are activated via an output stage of heating control means 30. To this end, the output stage has, as indicated in FIG. 5, by way of example, lines to ignition device 15, fuel pump 13, combustion air blower 14, water circulating pump 25 and vehicle blower 23 for activating the respective component in dependence upon the temperature gradient, or based upon the heat-up peiod $T_A$, in the manner as detailed in the control process steps described above.

It is to be understood that, departing from the example depicted, instead of the microprocessor 32, separate devices can be used for the control unit, the timer, the differential determining device, etc. For determining the heat-up timer, the timer may be connected with a comparator device whose outputs can be correspondingly linked with the control unit, in order to perform the inventive control process, and to activate operation of the heating device in accordance with such process.

In the event of a malfunction, control unit 31 activates a malfunction indicator device 39 in order to trigger an alarm, or similar means, whereby, particularly, a detailed error diagnosis may occur.

The arrangement of the temperature sensor, or temperature sensors, is such that a reliable sensing of the decisive values for the control is ensured.

I claim:

1. Process for controlling heating output of a heating device, particularly for use in vehicles, operating with a heat exchange medium, in which the heat output is controlled in dependence upon a control temperature and predetemined temperature threshold values to produce at least full load high heat output, partial load low heat output and switched off operational states comprising the steps of determining a temperature gradient with respect to time during heating of the heat exchange medium between two of said temperature threshold values and, in dependence upon the slope of the temperature gradient, controlling the operational state of the heating device.

2. Process according to claim 1, wherein the time required to heat the heat exchange medium between the two temperature threshold values is measured and used to determine the slope of said temperature gradient.

3. Process according to claim 2, wherein the heating device is switched off when the time measured for heating the heat exchange medium falls below a first predetermined value.

4. Process according the claim 3, wherein the heat exchange medium is circulated, for dissipation of residual heat after the heating device is switched off.

5. Process according to claim 3, wherein circulation of the heat exchange medium is terminated when the heating device is switched off.

6. Process according to claim 3, wherein a temperature threshold value for changing the operational state of the heating device is lowered when the time measured for heating the heat exchange medium falls below a second predetermined value which is greater than the first predetermined value.

7. Process according to claim 6, wherein a basic manner of controlling operation of the heating device is carried out when the second predetermined value is exceeded by the measured time for heating the heat exchange medium.

8. Process according to claim 7, wherein the two temperature threshold values between which the temperature gradient is determined are a temperature threshold value at which a vehicle blower is activated, and a temperature threshold value at which the heating device shifts into the partial load low output operational state.

9. Process according to claim 1, wherein the two temperature threshold values between which the temperature gradient is determined are a temperature threshold value at which a vehicle blower is activated, and a temperature threshold value at which the heating device shifts into the partial load low output operational state.

10. Process according to claim 9, wherein the temperature threshold value for the activation of the heating blower is approximately 50° C. and the temperature threshold value for the shifting of the heating device into the partial load low output operation state is at approximately 80° C.

11. Switching device for controlling the output of a heating device, particularly for use in vehicles, comprising a heat output control means for placing the heating device in at least full load, partial load, and switched-off operational states in dependence upon a control temperature sensed by a temperature sensor in a heat exchange medium of the heating device and based on predetermined temperature threshold values, a sensing device for determining a temperature gradient with respect to time of the heat exchange medium during heating thereof between at least two of said temperature threshold values, a control unit which is connected with the sensing device and which is a means for activating the heat output control means dependent upon a slope of the temperature gradient.

12. Switching arrangement according to claim 11, wherein the sensing device for the temperature gradient is a timer means for measuring the time period required for heating the heat exchange medium between said at least two threshold values.

13. Switching arrangement according to claim 12, wherein the control unit is operative to turn off the heating device by way of the heat output control means when the time period measured by the timer means is below a first predetermined value.

14. Switch arrangement according to claim 13, comprising means for keeping a heat exchange medium circulating pump in operation after the heating device is turned off.

15. Switching arrangement according to claim 13, wherein the control unit comprises means to activate a malfunction indicator device.

16. Switching arrangement according to claim 13, comprising means for lowering a temperature threshold value, at which the control unit operates the heat output control means to change the operational state of the heating device, when the time period measured by the timer means is below a second predetermined value which is greater than the first predetermined value.

17. Switching arrangement according to claim 16, wherein the control unit is operative to keep the heat output control means in a basic control operation when the time period measured by the timer means exceeds said second predetermined value.

18. Switching arrangement according to claim 18, further comprising comparator control means, outputs of which are connected with said control unit for comparing the first and second predetermined values with the time period measured by the timer means.

19. Switching arrangement according to claim 18, comprising means for activating the timer means when the temperature sensed by the temperature sensor exceeds a temperature threshold for switching on of a vehicle blower, and for deactivating the timer means when a temperature threshold value for placing the heating device in the partial load operational state is reached, and a differential determining device for determining the time period measured as a value characteristic for the slope of the temperature gradient.

20. Switching arrangement according to claim 12, comprising means for activating the timer means when the temperature sensed by the temperature sensor exceeds a temperatue threshold for switching on of a vehicle blower, and for deactivating the timer means when a temperature threshold value for placing the heating device in the partial load operational state is reached, and a differential determining device for determining the time period measured as a value characteristic for the slope of the temperature gradient.

21. Switching arrangement according to claim 13, wherein the first predetermined value is approximately 1 minute.

22. Switching arrangement according to claim 16, wherein the first predetermined value is approximately 1 minute and the second predetermined value is approximately 3 minutes.

* * * * *